United States Patent
Cetnar et al.

(10) Patent No.: US 9,970,586 B2
(45) Date of Patent: May 15, 2018

(54) FUEL PIPE CLAMP

(71) Applicant: Toyota Motor Engineering & Manufacturing North America, Inc., Erlanger, KY (US)

(72) Inventors: Brent C. Cetnar, Livonia, MI (US); Hayato Shimizu, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 229 days.

(21) Appl. No.: 14/453,320

(22) Filed: Aug. 6, 2014

(65) Prior Publication Data

US 2016/0040822 A1 Feb. 11, 2016

(51) Int. Cl.
| | |
|---|---|
| *F16L 57/00* | (2006.01) |
| *B60T 17/04* | (2006.01) |
| *B60R 16/02* | (2006.01) |
| *F16L 3/10* | (2006.01) |
| *F16L 3/237* | (2006.01) |

(52) U.S. Cl.
CPC .......... *F16L 57/00* (2013.01); *B60R 16/0215* (2013.01); *B60T 17/046* (2013.01); *F16L 3/1075* (2013.01); *F16L 3/1091* (2013.01); *F16L 3/237* (2013.01)

(58) Field of Classification Search
CPC ... F16L 3/02; F16L 3/08; F16L 3/1025; F16L 3/1218; F16L 16/1226; F16L 3/1226; F16L 3/13; F16L 3/22; F16L 3/221; F16L 3/2235; F16L 3/227; F16L 3/237; F16L 3/1075; F16L 3/1091; Y10T 29/49876; B60T 17/046

USPC .............. 248/49, 58, 61, 62, 65, 68.1, 72
See application file for complete search history.

(56) References Cited

U.S. PATENT DOCUMENTS

| | | | | |
|---|---|---|---|---|
| 492,593 | A * | 2/1893 | Taylor | F16L 3/10 |
| | | | | 110/184 |
| 799,092 | A * | 9/1905 | Rosenfeld | F16L 3/2235 |
| | | | | 211/60.1 |
| 802,103 | A * | 10/1905 | Houghton | F16L 3/24 |
| | | | | 248/68.1 |
| 810,004 | A * | 1/1906 | Tabler | F16L 3/13 |
| | | | | 114/364 |
| 1,816,301 | A | 7/1931 | Sundell | |
| 2,951,672 | A * | 9/1960 | Bott | B60N 3/12 |
| | | | | 248/317 |
| 3,310,270 | A * | 3/1967 | Ciancio | F16L 3/08 |
| | | | | 248/210 |
| 4,252,289 | A * | 2/1981 | Herb | F16L 3/11 |
| | | | | 248/62 |

(Continued)

FOREIGN PATENT DOCUMENTS

| | | | | |
|---|---|---|---|---|
| DE | 29913965 U1 * | 11/1999 | | A47B 21/06 |
| WO | WO 2013070858 A1 * | 5/2013 | | F16L 3/223 |
| WO | WO 2013141514 A1 * | 9/2013 | | A47B 57/54 |

*Primary Examiner* — Jacob Cigna
(74) *Attorney, Agent, or Firm* — Dinsmore & Shohl LLP (57) ABSTRACT

An apparatus for protecting a tubing from a moving object includes a housing and a hooking member. The housing includes an exterior surface and a passage. The passage is configured to receive the tubing, and extends from a first end to a second end of the housing. The hooking member extends from the exterior surface of the housing, and is configured to catch onto the moving object to protect piece of tubing.

19 Claims, 8 Drawing Sheets

(56) References Cited

U.S. PATENT DOCUMENTS

| | | | |
|---|---|---|---|
| 4,264,047 A | 4/1981 | Nelson | |
| 4,911,387 A * | 3/1990 | Daiglo | F16L 3/00 248/62 |
| 5,115,542 A | 5/1992 | Gehres | |
| 5,141,192 A * | 8/1992 | Adams | F21S 4/10 248/229.26 |
| 5,257,768 A | 11/1993 | Juenemann et al. | |
| 5,363,539 A * | 11/1994 | Tisol | F16L 3/2235 24/339 |
| 5,535,969 A * | 7/1996 | Duffy, Jr. | F16L 3/227 24/487 |
| 5,547,152 A * | 8/1996 | Krock | F16L 3/1008 24/274 WB |
| 5,613,655 A * | 3/1997 | Marion | F16L 3/2235 24/339 |
| 5,669,590 A * | 9/1997 | Przewodek | F16L 3/221 248/68.1 |
| 5,820,422 A * | 10/1998 | Chadbourne | H01R 4/5083 24/136 L |
| 5,884,372 A * | 3/1999 | Anscher | F16L 3/13 24/3.12 |
| 5,941,483 A | 8/1999 | Baginski | |
| 5,957,416 A * | 9/1999 | Sellati | F16L 3/133 248/58 |
| 6,105,216 A * | 8/2000 | Opperthauser | F16L 3/24 24/279 |
| 6,142,429 A * | 11/2000 | Ahroni | F21S 4/10 248/68.1 |
| 6,464,530 B1 * | 10/2002 | Smith | H01R 13/5833 439/449 |
| 6,517,032 B1 * | 2/2003 | Gretz | F16L 3/23 248/62 |
| D471,787 S * | 3/2003 | Gebrara | D8/354 |
| 6,561,466 B1 | 5/2003 | Myers et al. | |
| 6,691,381 B2 * | 2/2004 | Scollard | F02M 69/465 123/469 |
| 7,007,900 B2 | 3/2006 | Goodwin et al. | |
| 7,294,789 B1 * | 11/2007 | Watthanasintham | B60R 16/0215 174/135 |
| 7,297,874 B2 * | 11/2007 | Yasuda | B60R 16/0215 174/135 |
| 7,387,282 B2 | 6/2008 | Kovac | |
| 7,464,966 B2 | 12/2008 | Miyajima et al. | |
| 7,635,108 B2 * | 12/2009 | Zeuner | B64C 1/406 248/228.1 |
| 7,651,057 B2 * | 1/2010 | Sedivy | F16L 3/237 248/68.1 |
| 7,784,745 B2 * | 8/2010 | Dodge | F16L 3/12 138/149 |
| 7,896,296 B2 * | 3/2011 | Julian | F16L 3/127 248/547 |
| 7,997,773 B2 * | 8/2011 | Kraus | H02G 3/24 362/249.01 |
| 8,074,943 B2 * | 12/2011 | Boudreau | F16L 3/221 174/40 R |
| 8,727,288 B2 * | 5/2014 | Ruiz | H02G 3/30 248/65 |
| 9,004,414 B2 * | 4/2015 | Durben | A47G 25/08 24/303 |
| 9,088,146 B2 * | 7/2015 | Schnoor | H02G 3/32 |
| 9,166,385 B2 * | 10/2015 | Newman | H02G 1/00 |
| 9,341,285 B2 * | 5/2016 | Magno, Jr. | H02G 3/32 |
| 9,450,130 B2 * | 9/2016 | Grushkowitz | F16L 3/24 |
| 2004/0026577 A1 * | 2/2004 | Yasuda | B60R 16/0215 248/74.3 |
| 2005/0211463 A1 * | 9/2005 | Zeuner | H02G 3/30 174/138 G |
| 2008/0078891 A1 * | 4/2008 | Hobson | F16L 3/127 248/74.2 |
| 2010/0207001 A1 * | 8/2010 | Smith | F16L 3/1075 248/230.4 |
| 2010/0308182 A1 * | 12/2010 | Lahti | F16L 3/22 248/59 |
| 2012/0153095 A1 * | 6/2012 | Child | F16L 3/2235 248/68.1 |
| 2012/0192925 A1 * | 8/2012 | Grushkowitz | F16L 3/24 136/251 |
| 2012/0198680 A1 * | 8/2012 | Durben | A47G 25/08 29/428 |
| 2013/0112817 A1 | 5/2013 | Unger | |
| 2013/0146721 A1 * | 6/2013 | White | F16L 3/02 248/68.1 |
| 2013/0256471 A1 * | 10/2013 | Ruiz | H02G 3/30 248/74.2 |
| 2014/0061396 A1 * | 3/2014 | Magno, Jr. | H02G 3/32 248/72 |
| 2014/0374544 A1 * | 12/2014 | Pearson | F16L 3/223 248/68.1 |
| 2015/0108288 A1 * | 4/2015 | Lee | A47B 96/1425 248/68.1 |
| 2016/0003375 A1 * | 1/2016 | Robertson, Jr. | F16B 1/00 248/341 |

* cited by examiner

FUEL PIPE CLAMP

FIELD OF THE INVENTION

The present disclosure relates to an apparatus for securing tubing, specifically an apparatus for securing tubing such as brake and fuel lines in a vehicle to protect the tubing from contact with a moving object.

BACKGROUND OF THE INVENTION

Clamps for securing tubing have been known for quite some time. These clamps have traditionally been used to help secure, bundle and protect various pipes, cables, and lines from contact with other objects. The clamps are also known to attach to various structures. One such example is disclosed in U.S. Pat. No. 4,264,047.

The previous clamp designs leave room for improvement insomuch as securing the clamp to another object can prove to be awkward or burdensome in the assembly process. As such, a new device is desired that can help secure tubing in a vehicle without the need to attach directly to the vehicle and thereby easing the assembly process.

SUMMARY OF THE INVENTION

An apparatus disclosed herein is for protecting tubing secured within the apparatus from a moving object that would impact the tubing without the presence of the apparatus. The apparatus may or may not be in the form of a bracket and includes a housing which has an exterior surface and a passage. The passage is configured to receive and secure the piece of tubing and extends from a first end of the housing to a second end of the housing. A hooking member extends from the exterior surface of the housing. In addition, the hooking member is configured to catch onto the moving object and prevent contact between the moving object and the piece of tubing.

Also disclosed herein is a method for protecting a piece of tubing from a moving object. The method includes providing a piece of tubing and an apparatus that has a housing with an exterior surface, a passage, and a hooking member extending from the exterior surface of the housing. The passage extends from a first end of the housing to a second end of the housing and is configured to receive and secure the piece of tubing. A panel is also provided. The piece of tubing is placed into the passage of the apparatus and the panel is moved into contact with the apparatus. The hooking member catches on the panel and prevents the panel from contacting the piece of tubing.

BRIEF DESCRIPTION OF THE DRAWINGS

Other objects, features, and advantages of the invention will become more readily apparent upon reading the following detailed descriptions of the illustrated embodiments taken together with the accompanying drawings wherein.

DETAILED DESCRIPTION OF THE ILLUSTRATED EMBODIMENTS

The present disclosure enables the protection of tubing secured within an apparatus from a moving object impacting the apparatus by way of a hooking member that extends from an exterior surface of the apparatus.

The hooking member protects the tubing by engaging and latching onto the moving object. For example, in a vehicle crash type situation various structures such as panel components and the like are deformed and displaced. In addition, a panel can come into contact with the tubing. However, the apparatus disclosed herein engages the panel with the hooking member and thus prevents the panel from contacting the tubing. Once engaged, the apparatus and the moving object move together and thereby help protect and control movement of the tubing in the crash type situation without the need for bolting or otherwise fixing of the apparatus to a vehicle structure. In this manner, an easier assembly of the apparatus and tubing is provided.

With reference now to FIGS. 1-13, various embodiments of the apparatus are shown. In particular, FIGS. 1-7 illustrate an apparatus with a housing 20 that has an exterior surface 22 and a passage 24. The apparatus also includes a hooking member 26 that extends from the exterior surface 22 of the housing 20.

The passage 24 of the housing 20 extends from a first end 28 of the housing 20 to a second end 30 of the housing 20. The passage 24 is further configured to receive and secure a piece of tubing 32. The hooking member 26 is configured to catch onto the moving object, in this case a wheel well apron 33 of a vehicle.

The housing 20 may or may not be rectangular in shape when viewed from the top or bottom. When viewed from the first end 28 or the second end 30, the passage 24 has a general U-shape. An interior surface 34 of the U-shape defining the passage 24 includes various protrusions 36 to help secure tubing 32 disposed therein. The protrusions 36 can be configured to receive individual pieces of tubing 32 joined by a connecting member 37 within each passage 24. The hooking member 26 extends from the exterior surface 22 in a J-type shape when viewed from a side profile of the hooking member 26. When determining where the hooking member 26 extends from the exterior surface 22, consideration is given to the intended location of the apparatus within the vehicle. In addition, consideration is given to the location of the moving object such as the apron 33, other vehicle components such as an engine 39, and how the moving object will be displaced over time. For example and illustrative purposes only, how the wheel well apron 33 will be displaced and deformed in a crash type situation can be considered as to where the hooking member 26 will extend from the exterior surface 22.

The exterior surface 22 of the housing 20 also includes a generally flat area 38 that is located adjacent to the hooking member 26. The generally flat area 38 is a plane that runs along the top of the exterior surface 22. The generally flat area 38 includes various depressions and valleys 40. Such depressions and valleys 40 could possibly be from the formation of the U-shaped portions of the housing 20 or of the protrusions 36 within the passage 24. In some instances, no material extends beyond the generally flat area 38 that could interfere with the operation of the apparatus, for example by snagging or getting caught up on the apron 33 before it engages the hooking member 26.

The hooking member 26 includes a hook portion 41 and an elongated catching surface 42 giving an adequate amount of width W to the J-shape of the hooking member 26, and thereby providing an increased area to the hooking member 26 for engaging the apron 33. The hook portion 41 extends outwardly from the elongated catching surface 42 in a direction generally parallel to an axial direction A of the passage 24.

Figure 1:
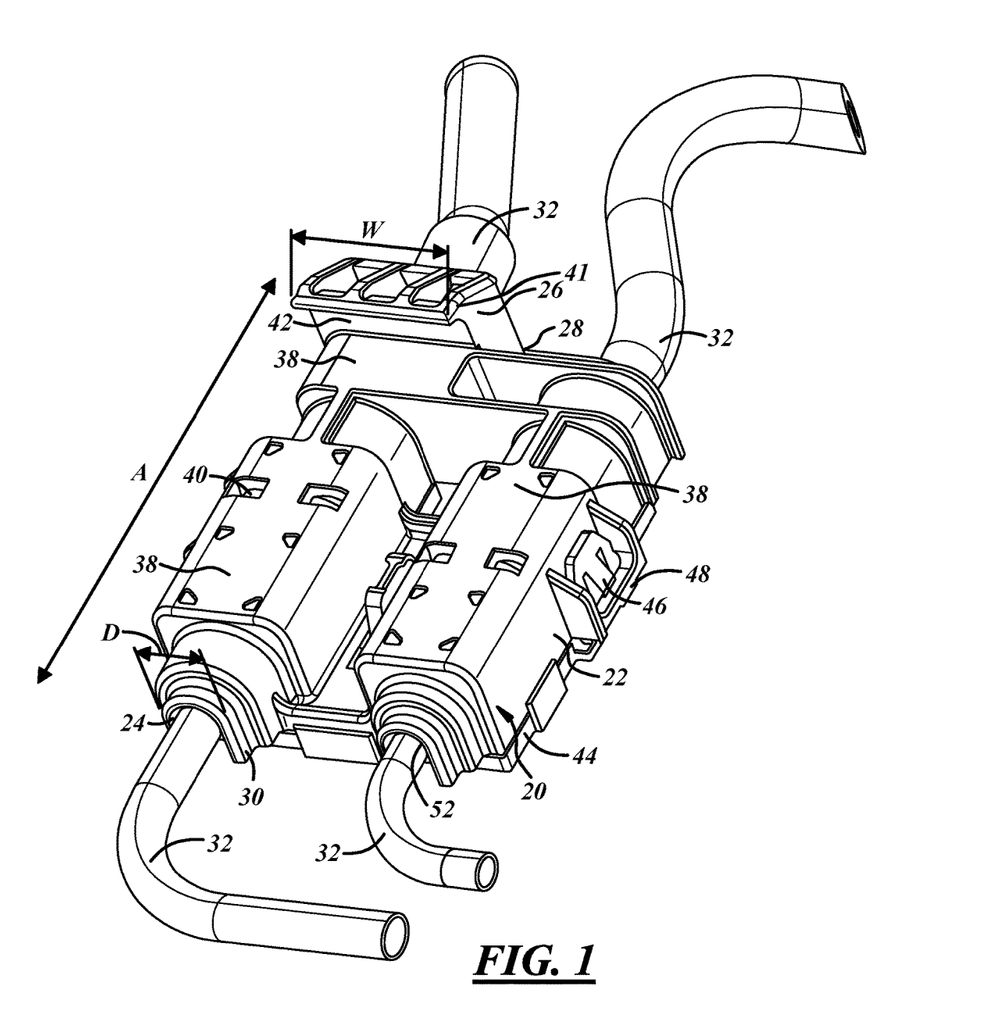
FIG. 1 is a perspective top view of one embodiment of the apparatus.
Figure 2:
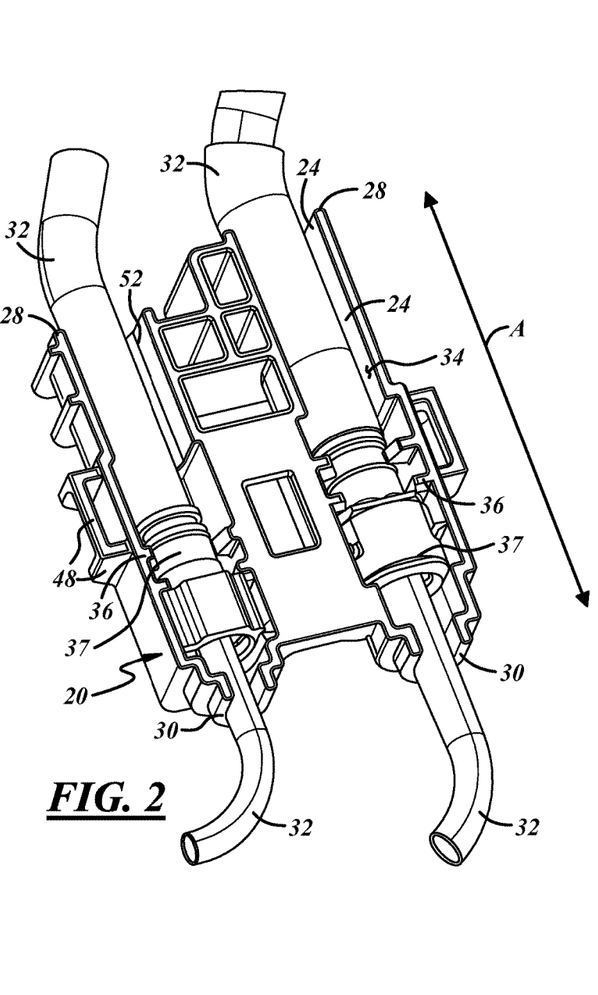
FIG. 2 is a perspective bottom view of the apparatus.

In the embodiment of the apparatus shown in FIG. 1, the hooking member 26 extends from the first end 28 of the housing 20. Locating the hooking member 26 at the first end 28 maximizes the area of the generally flat area 38 available to engage with the apron 33, directing the apron 33 towards the hooking member 26 and thereby increasing the effectiveness of the apparatus.

Figure 13:
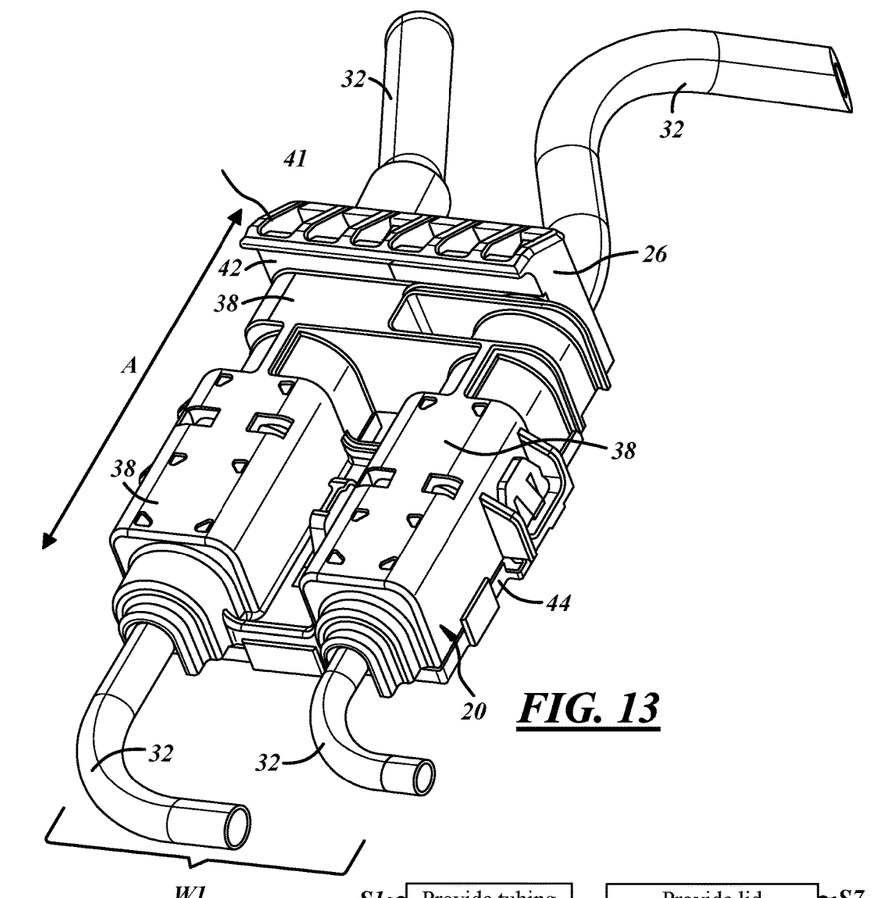
FIG. 13 is a perspective top view of yet another embodiment of the apparatus.

In some instances, the elongated catching surface 42 of the hooking member 26 extends from the exterior surface 22 in a direction perpendicular to an axial direction A of the passage 24, as can be seen in FIGS. 1 and 13. The axial direction A of the passage 24 is generally the direction from the first end 28 to the second end 30 of the housing 20. As shown in FIG. 1, the elongated catching surface 42 extends perpendicular to the axial direction A of the passage 24 at least as far as a diameter D of the passage 24, thereby providing a hooking member 26 that covers the entire width of the tubing 32 secured within the passage 24.

Figure 8:
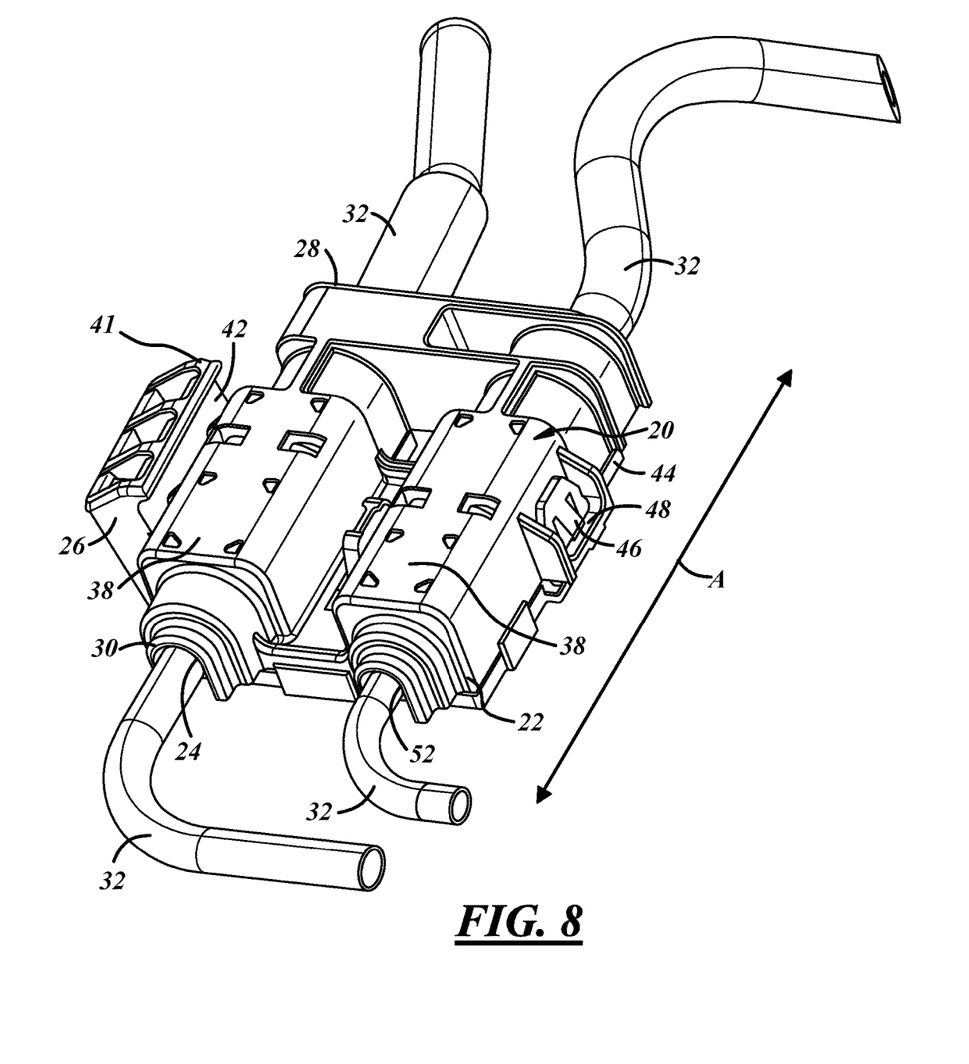
FIG. 8 is a perspective top view of another embodiment of the apparatus.
Figure 9:
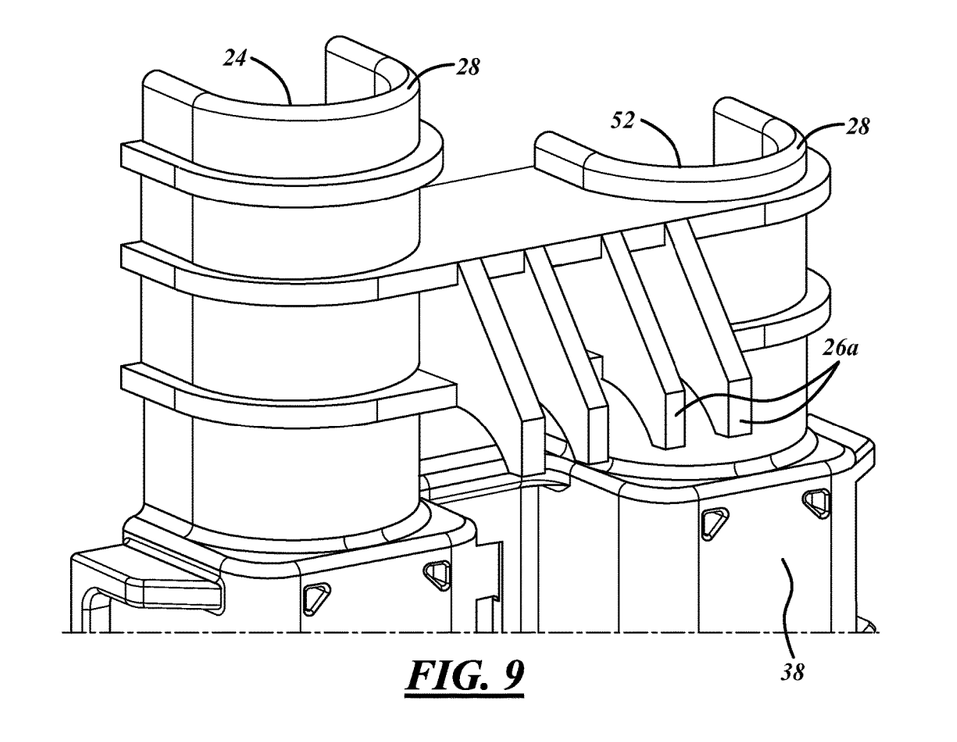
FIG. 9 is a perspective top view of a portion of another embodiment of the apparatus.

Depending on the tubing layout within the vehicle, the location of the apparatus, and the path of the moving object, other configurations of the hooking member 26 may be beneficial. For example, the hooking member 26 shown in FIG. 13 features an elongated catching surface 42 that extends perpendicular to the axial direction A of the passage 24 as far as a width W1 of the housing 20. Another example is shown in FIG. 8, where the elongated catching surface 42 extends from the exterior surface 22 parallel to the axial direction A of the passage 24. The hooking member 26 may also be one or more individual hooks 26a extending from the housing 20, as shown in FIG. 9.

Figure 5:
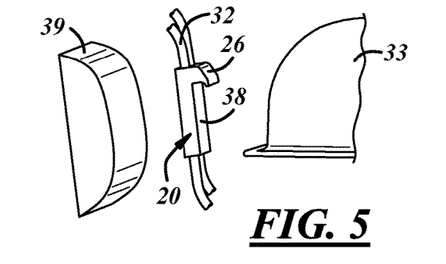
FIG. 5 is a perspective side view of simplified apparatus of FIG. 1 in an initial condition in a vehicle.
Figure 6:
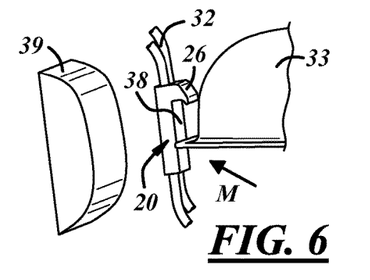
FIG. 6 is a perspective side view of the simplified apparatus and apron of FIG. 5 when the apron initially contacts the apparatus.
Figure 7:
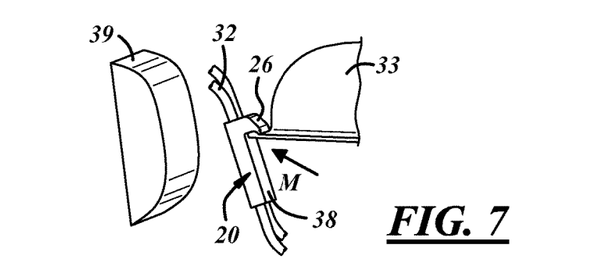
FIG. 7 is a perspective side view of the simplified apparatus and apron of FIG. 5 when the apron engages a hooking member of the apparatus.

With reference now to FIGS. 5-7, the apron 33 being deformed and displaced in a crash type situation, and engaging the apparatus is shown. FIG. 5 shows the apron and apparatus in their initial condition with a space existing between the housing 20 and the apron 33. In a crash type situation the apron 33 deforms and is displaced, as represented by arrow M, with a lip 43 of the apron 33 moving relative to the housing 20. The lip 43 of the apron 33 initially contacts the housing 20 at the exterior surface 22 on the generally flat area 38, as can be seen in FIG. 6. The lip 43 slides along the generally flat area 38 and is directed towards and contacts the hooking member 26, as shown in FIG. 7. Once the lip 43 engages the hooking member 26, the housing 20 becomes engaged with the apron 33 by way of the J-shape of the hooking member 26 latching onto the lip 43. In addition, the engagement of the hooking member 26 causes the housing 20 to move with the apron 33 as the apron 33 continues to be displaced and deformed. This engagement helps prevent contact between the apron 33 and the tubing 32 and also helps control movement of the tubing 32 relative to the apron 33 and other structural elements of the vehicle, such as the engine 39.

Figure 10:
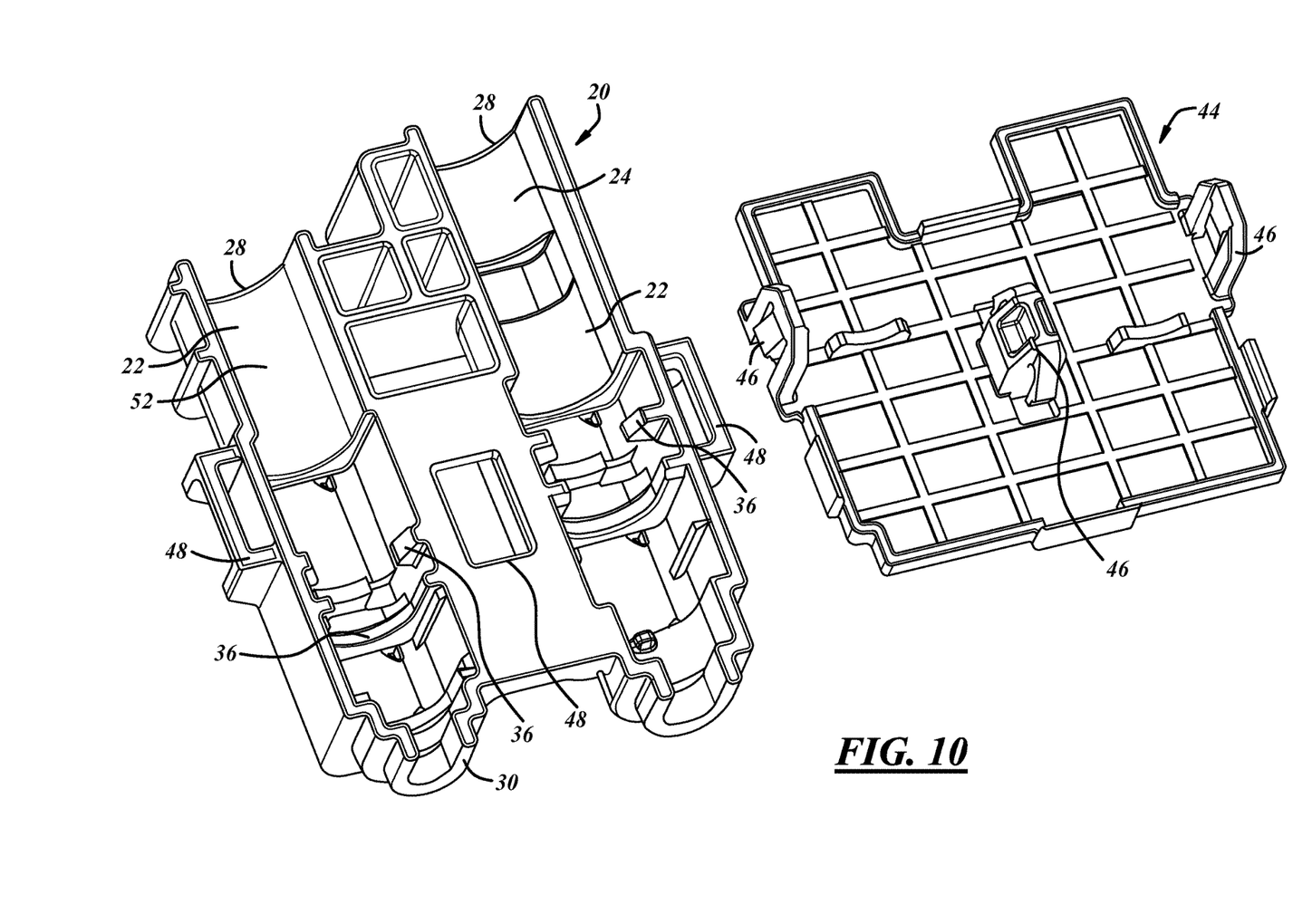
FIG. 10 is a perspective view of the apparatus and lid of FIG. 3 in a disassembled state.
Figure 11:
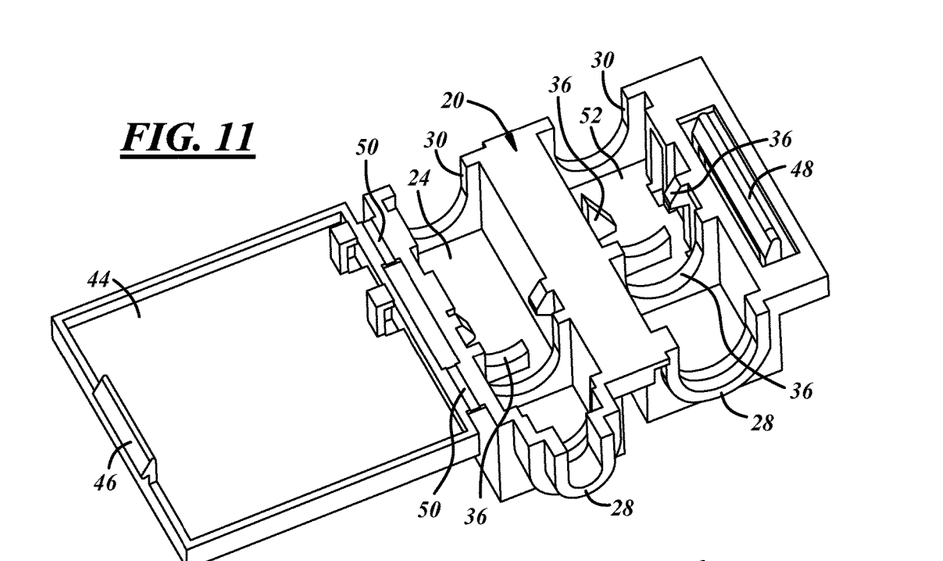
FIG. 11 is a perspective bottom view of an apparatus having a single hinged lid.
Figure 12:
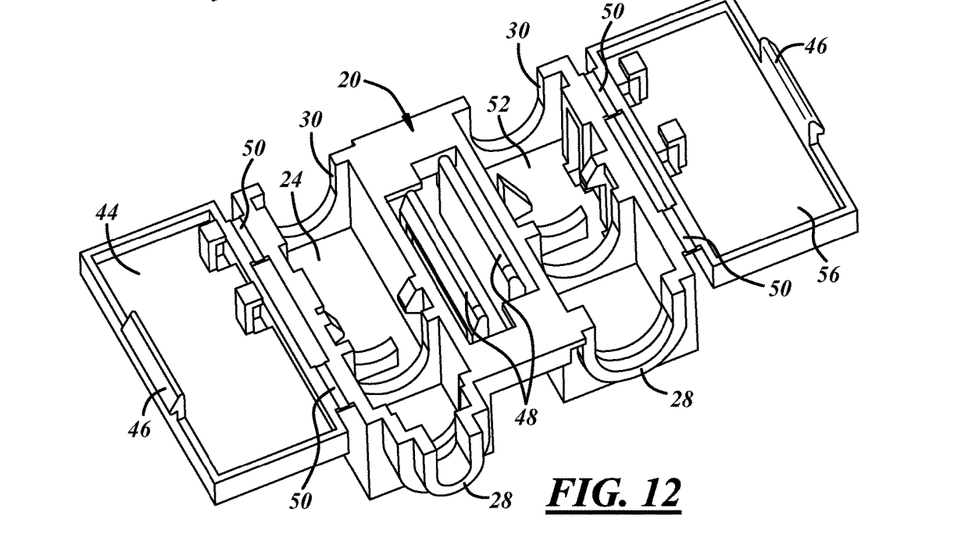
FIG. 12 is a perspective bottom view of an apparatus having a double hinged lid.

The apparatus can further include a lid 44, as shown in FIGS. 3 and 10-12. The lid 44 is configured to attach to the housing 20 and covers an open top of the U-shaped profile of the passage 24. In this manner, the lid 44 further secures and protects the tubing 32 within the housing 20. The lid 44 can attach to the housing 20 by way of a pair of or more clips 46 extending from the lid 44, engaging a pair of flanges 48 of the housing 20. As can be seen in FIG. 10, the lid 44 can be an individual or separate piece that secures to the housing 20, or as can be seen in FIG. 11, the lid 44 can be attached to the housing 20 by way of a hinge 50. In addition, the lid 44 can actually be two or more lids 44, 56 as illustrated in FIG. 12.

Figure 3:
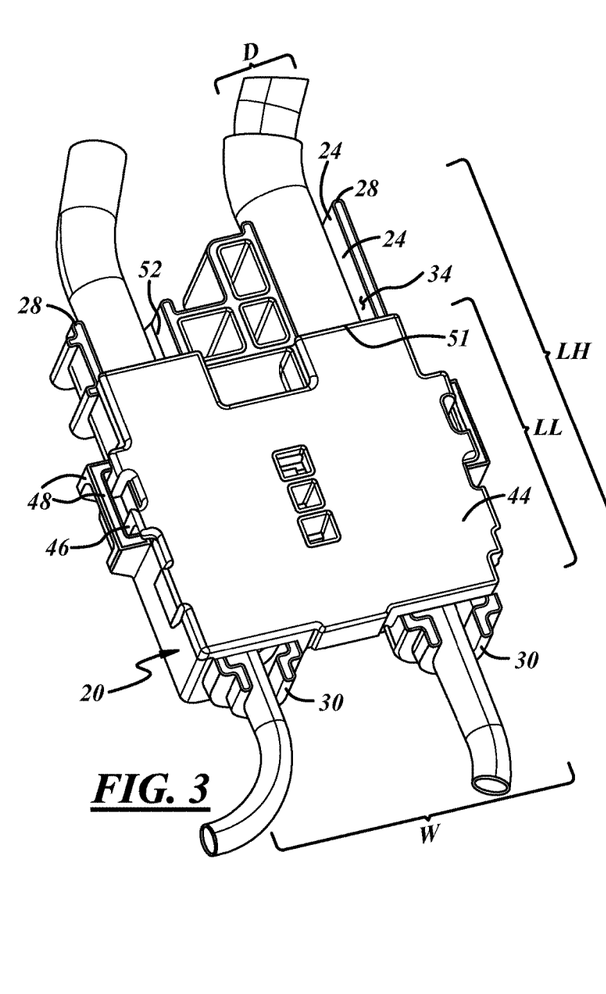
FIG. 3 is a perspective bottom view of the apparatus of FIG. 1 with a lid.
Figure 4:
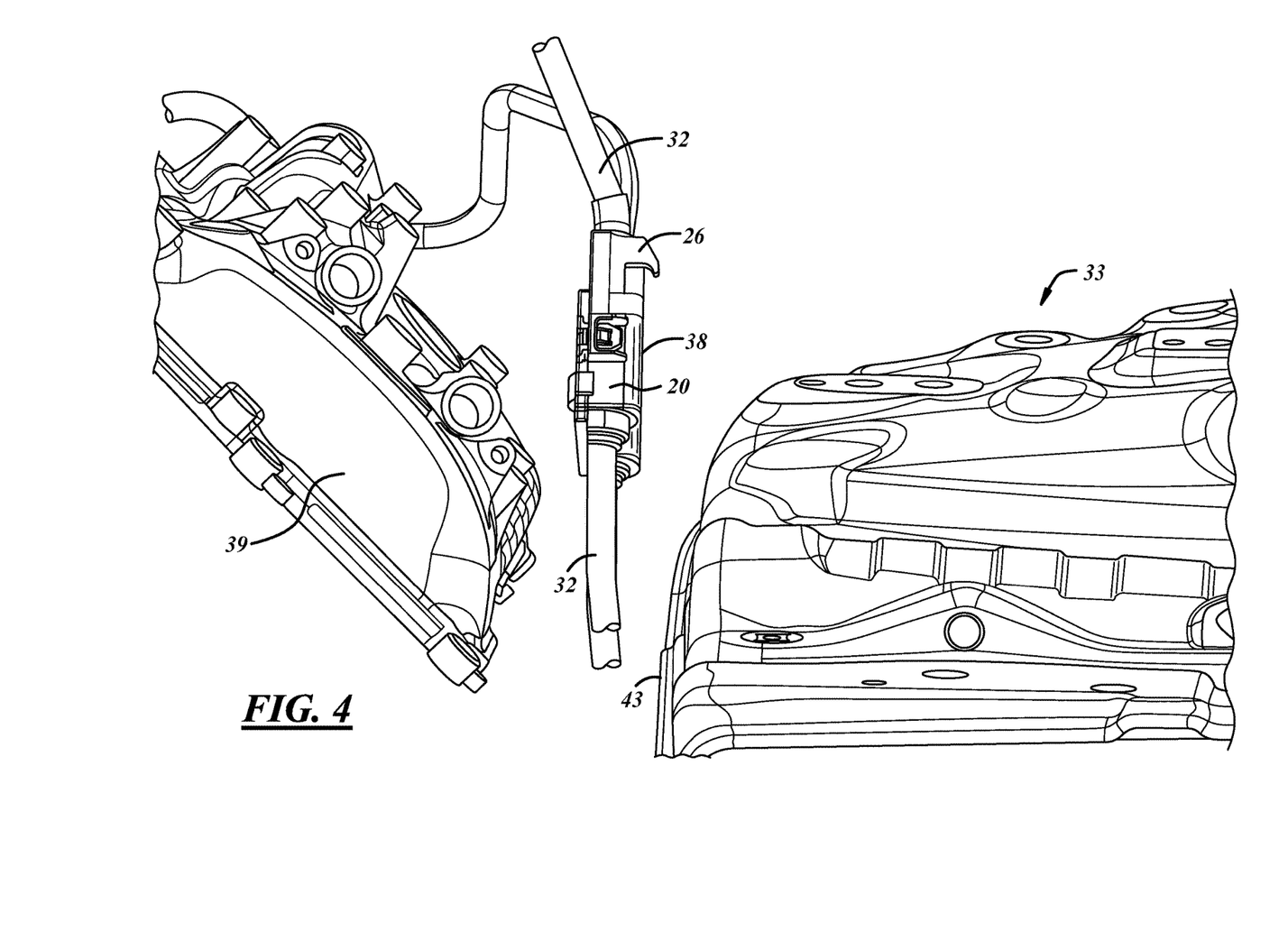
FIG. 4 is a perspective side view of the apparatus of FIG. 1 installed in a vehicle having an engine block and an apron.

With reference to FIG. 3, the passage 24 extends the entire length of the housing 20 LH, and a length of the lid 44 LL is less than the length of the housing 20 LH. Providing a lid length LL shorter than the housing length LH creates two points of applied forces acting on the tubing 32 if the moving object misses the generally flat area 38 and the hooking member 26, and comes in contact with the tubing 32 above the first end 28 of the housing 20. Specifically, one force is applied to the tubing 32 at the first end 28 of the housing by the moving object and another force is applied on the tubing 32 by the end 51 of the lid 44 securing the tubing 32 within the passage 24. Separating these forces increases a radius of curvature in the tubing 32 when the tubing 32 is bent by the opposing forces, thereby reducing stress in the tubing 32.

The housing 20 may include another passage 52 in addition to the above described passage 24 (FIG. 10). The passage 52 has similar characteristics to the passage 24, and the passages 24 and 52 enable an increased number or pieces of tubing 32 to be secured within the housing 20. When the passage 52 is formed in the housing 20, another lid 56 can be hingedly attached to the housing 20, as shown in FIG. 12. The lids 44 and 56 can include clips 46 that engage flanges 48 of the housing 20 to maintain the lids in a closed position.

The housing 20 with the extending hooking member 26 as well as the lids 44, 56 can be made of injection molded plastic or by any other material and method known to those skilled in the art.

Figure 14:
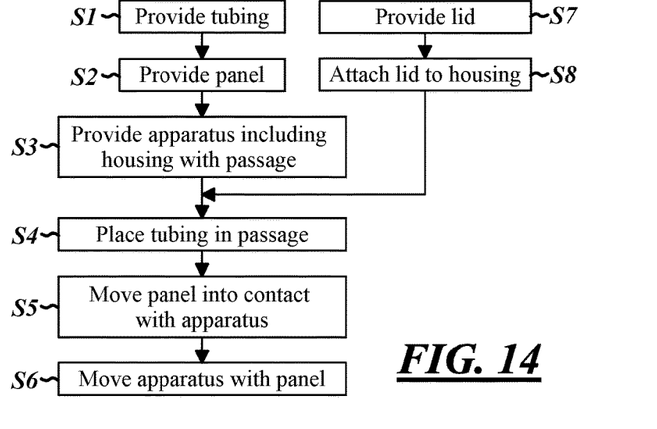
FIG. 14 is a flowchart showing a method of using the apparatus.

With reference to FIG. 14, a method for protecting a piece of tubing includes providing a piece of tubing at step S1 such as a brake or fuel line of a vehicle; providing a panel at step S2, such as an apron, sheet metal, bracket, panel or other structure in a vehicle; providing an apparatus S3 having a housing with an exterior surface, a passage, and a hooking member extending from the exterior surface of the housing with the passage extending from a first end of the housing to a second end of the housing. The passage is configured to receive and secure the piece of tubing as described above. The tubing is placed into the passage of the apparatus at step S4. The panel moves into contact with the apparatus at step S5, the hooking member catching the panel and preventing the panel from catching the piece of tubing. The method may also include moving the apparatus with the panel after the hooking member catches the panel at step S6 as well as providing a lid configured to attach to the housing at step S7 and attaching the lid to the housing after the tubing is placed into the passage at step S8.

While the invention has been described hereinabove with reference to the preferred embodiments, the invention is not limited thereto. On the contrary, various changes, modifications, or alternatives may become apparent to those skilled in the art upon reading the foregoing descriptions. Accordingly, the present invention is intended to embrace all such changes, modifications, and alternatives insofar as they fall within the spirit and scope of the appended claims.

housing 20
exterior surface 22
passage 24
hooking member 26
individual hooks 26a
first end 28
second end 30
tubing 32
apron 33
interior surface 34
protrusions 36
connecting member 37
generally flat area 38
engine 39
valleys 40
elongated catching surface 42
lip 43
lid 44
clips 46
flanges 48
hinge 50
end 51
passage 52
width W (of hooking member 26)
axial direction A (of passage 24)
diameter D (of passage 24)
width W1 (of housing 20)
length of the housing LH
length of the lid LL

We claim:

1. An apparatus for protecting a piece of tubing of a vehicle secured therein from a moving object impacting said apparatus, said apparatus comprising: a housing having an exterior surface and a generally U-shaped passage extending from a first end of said housing to a second end of said housing, said exterior surface having a generally flat area, and said U-shaped passage having an open end opposite said flat area on said exterior surface of said housing, said U-shaped passage configured to receive and secure the piece of tubing, said housing extends a first distance in the axial direction of the U-shaped passage; and a hooking member having an elongated catching surface and a hook portion, said elongated catching surface extending from said exterior surface of said housing from one of said first end or said second end in a direction generally perpendicular to an axial direction of said U-shaped passage, said hook portion extending outwardly from said elongated catching surface in a direction generally parallel to said axial direction of said U-shaped passage, said hook portion extends a second distance in the axial direction of the U-shaped housing, the second distance is less than the first distance, said flat area positioned adjacent said hooking member; said hooking member configured to catch onto the moving object and prevent contact between the moving object and the piece of tubing during a vehicle collision in which the moving object is displaced.

2. The apparatus of claim 1, wherein said hooking member extends from said first end of said housing.

3. The apparatus of claim 1, wherein only said hooking member extends beyond said flat area on said exterior surface of said housing.

4. The apparatus of claim 3, wherein said elongated catching surface extends from said exterior surface perpendicular to an axial direction of said passage.

5. The apparatus of claim 4, wherein said passage has a diameter, and said elongated catching surface extends perpendicular to said axial direction at least as far as said diameter of said passage.

6. The apparatus of claim 4, wherein said housing has a width, and said elongated catching surface extends perpendicular to said axial direction as far as said width of said housing.

7. The apparatus of claim 1, further comprising a lid, said lid configured to attach to said housing to cover said open end of said U-shaped passage.

8. The apparatus of claim 7, wherein said lid is hingedly attached to said housing.

9. The apparatus of claim 7, wherein said lid has a pair of clips, said pair of clips engaging a pair of flanges on said housing when said lid is attached to said housing.

10. The apparatus of claim 7, wherein said U-shaped passage extends an entire length of said housing.

11. The apparatus of claim 10, wherein said lid has a length less than a length of said housing.

12. The apparatus of claim 7, wherein said housing includes a second generally U-shaped passage having an open end opposite said flat area on said exterior surface of said housing.

13. The apparatus of claim 12, further comprising a second lid, said lid and said second lid are hingedly attached to said housing to cover said open end of said U-shaped passage and said open end of said second U-shaped passage, respectively.

14. A method for protecting a piece of tubing of a vehicle from a moving object, the method comprising: placing a piece of tubing into a generally U-shaped passage of a housing, said housing having an exterior surface, a first end and a second end between which said generally U-shaped passage extends, and a hooking member having an elongated catching portion and a hook portion, said elongated catching portion extending from said exterior surface of said housing from one of said first end or said second end in a direction generally perpendicular to an axial direction of said U-shaped passage, said housing extends a first distance in the axial direction of the U-shaped passage, said hook portion extending outwardly from said elongated catching portion in a direction generally parallel to said axial direction of said U-shaped passage, said hook portion extends a second distance in the axial direction of the U-shaped housing, the second distance is less than the first distance, said exterior surface having a generally flat area, said U-shaped passage having an open end opposite said flat area on said exterior surface of said housing, said U-shaped passage configured to receive and secure said piece of tubing, said flat area positioned adjacent said hooking member; catching the moving object with said hooking member to prevent the moving object from contacting said piece of tubing during a vehicle collision in which the moving object is displaced.

15. The method of claim 14, wherein said housing moves with the moving object after said hooking member catches the moving object.

16. The method of claim 15 further comprising:
providing a lid configured to attach to said housing; and
attaching said lid to said housing after said piece of tubing is placed into said U-shaped passage.

17. The method of claim 16, wherein said lid covers said open end of said U-shaped passage.

18. A method for protecting a piece of tubing of a vehicle during a collision in which a vehicle component is displaced, said method comprising:
placing the piece of tubing into a generally U-shaped passage of a housing, said housing having an exterior surface having a generally flat area, and said U-shaped passage having an open end opposite said flat area on said exterior surface of said housing, said U-shaped passage extending from a first end of said housing to a second end of said housing, said U-shaped passage configured to receive and secure the piece of tubing, said housing having a hooking member extending from said exterior surface of said housing, said flat area positioned adjacent said hooking member; and
catching the displaced vehicle component with said hooking member during the collision such that said housing is displaced with the vehicle component to prevent contact between the vehicle component and the piece of tubing.

19. The method of claim 18, wherein said hooking member has an elongated catching portion and a hook portion, said elongated catching portion extending from said exterior surface of said housing from one of said first end or said second end in a direction generally perpendicular to an axial direction of said U-shaped passage, said hook portion extending outwardly from said elongated catching portion in a direction generally parallel to said axial direction of said U-shaped portion.

\* \* \* \* \*